June 2, 1953  J. B. BRENNAN  2,640,865
STORAGE BATTERY
Filed July 27, 1948

INVENTOR.
JOSPEH. B. BRENNAN
BY
West & Oldham
ATTORNEYS

Patented June 2, 1953

2,640,865

UNITED STATES PATENT OFFICE 2,640,865

STORAGE BATTERY

Joseph B. Brennan, Cleveland, Ohio

Application July 27, 1948, Serial No. 40,919

3 Claims. (Cl. 136—166)

This invention relates to electrolytic cells such as accumulators and method of assembly therefor utilizing absorbent porous metal plates filled with active ingredients in the pores thereof whereby plates of opposite polarity with suitable spacers therefor are assembled under hydraulic pressure and held under pressure in use which serves to retain the active ingredients in place inside the pores of the plates and to make the cell more constant in performance and of longer life and also to increase the efficiency and capacity of cells constructed according to this invention. The absorbent and porous character of the plates prevents sideways and downward flow or extrusion or movement of the active materials even under great pressure.

It is preferred according to my invention to fill in and impregnate the porous electrodes made by spray-depositing molten metal particles into layers from which suitable sized plates are cut or by spreading layers of powdered metal and sintering such layers and thereafter filling with active ingredients the pores of the plates made by sintering or spray-depositing.

After the pores are filled and the surface of the porous plates are coated with the active ingredients under hydraulic pressure the plates are stacked with suitable porous spacers as of asbestos or paper or ceramic material or glass cloth and/or a combination thereof which are suitably thick at least .003" to 0.30" therebetween, and after a sufficient number of plates of opposite polarity are stacked with the active ingredients in the pores thereof and having spacers therebetween the whole stack is put under pressure at least of one hundred pounds per square inch and so retained under pressure as to remain under pressure in service. The applied pressure locks the active ingredients on and in the pores of the plates.

The pressure assembly keeps the active ingredient particles in electrical contact with each other and with the porous plates in the pores thereof so that the internal resistance is low and the relative capacity high per unit of volume and weight. If smooth surfaced foils or merely perforated plates were used the applied pressure would cause flow of the active ingredients to the edges of the plates.

More rapid and constant rates of discharge are obtained with such an assembly.

A pair of stiff plates at the end of each stack with rods attached thereto will serve as a suitable clamp or preferably the container for the cell can be made into a clamp by welding or otherwise fastening after the assembly has been placed therein in pressurized relationship.

I prefer to use asbestos or paper spacers free from chlorides in making an alkaline cell according to my invention and powdered iron sintered into flat plates and powdered nickel or nickel plated iron powder sintered into flat plates, each of the porous sintered plates being impregnated and coated with suitable active ingredients prior to pressurized assembly. Or porous ceramic plates can be used as separators with the porous metallic layers deposited thereon.

Heretofore pressure has been secured on porous electrodes for battery or accumulator use by packing in containers such as perforated tubes or boxes of sheet metal, or a pair of stiff plates at the ends of each stack of electrodes with rods attached thereto have served as a fixed pressure means. I do not need the pressure withstanding means according to my invention, but use a flexible compressing means to hold a great number of porous plates of opposite polarity in alignment under pressure so that the active ingredients may be kept in place in the interstices while they receive and give up electrical charges.

The porous plates whether made by sintering layers of plated particles of metal or by spray depositing same as with a metal powder spray apparatus such as a Schori gun or with a Schoop pistol are sprayed onto a chilled base to control porosity and have electrolyte passages running irregularly from face to face created by the interconnecting interstices between the cohering particles of the metal layer.

Plates according to my invention are porous from top to bottom also and crosswise so as to permit and facilitate gassing when under pressure and packed with active material.

Referring to the drawings which are a part of the specifications hereof:

Figure 1:
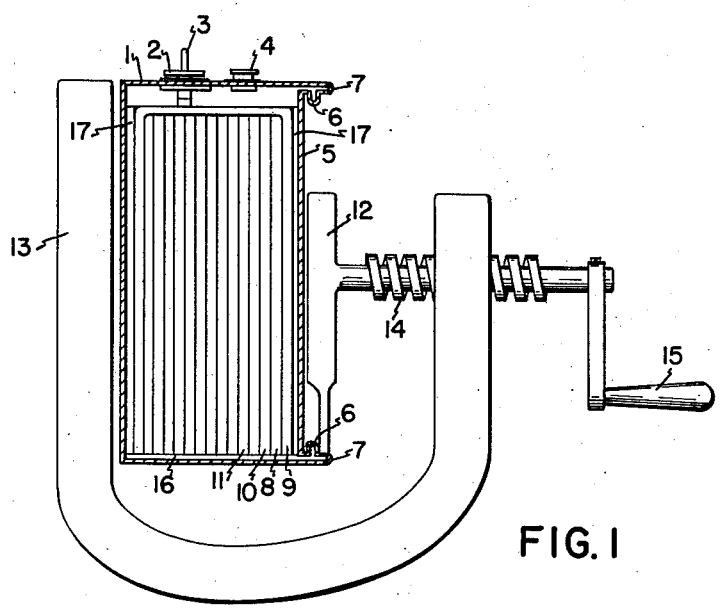
Fig. 1 is an elevation, partially shown in section, of an electrolytic cell embodying the principles of the invention shown during assembly of the cell.

Fig. 1 represents a flat plate battery assembled in a clamp device 13 whereby the handle 15 can tighten the clamp 12 by turning the screw 14 so that the metal container side 5 of the container 1 is clamped against the battery plate assembly 17, positioned for welding the side 5 to the container 1 at the edges 7.

The cover or side 5 has flexible edge portion 6 like a bellows so that after the side 5, Fig. 1 is welded around the edge 7 the cover 5 will keep on exerting resilient pressure on the plate assembly 17 so that a uniform and substantial pressure is maintained under all temperature and atmospheric conditions.

The alternate plates and spacers which make up the pressurized battery stack is porous throughout and 9 represents a spacer as of asbestos or a mixture of asbestos and glass fibers or threads or cotton or other non-contaminating, non-conducting porous fibers or particles.

8 represents a porous metallic plate impregnated with active material, 10 represents a porous spacer and thereafter a porous metallic plate 11 of opposite polarity and so on.

Each set of plates is connected to a terminal of suitable polarity. One terminal 3 is shown with insulating washer 2 extending through the cover of container 1. A suitable vent 4 for escaping gases is provided. A suitable porous support and spacer as of asbestos 16 is placed under the plate assembly.

Figure 2:
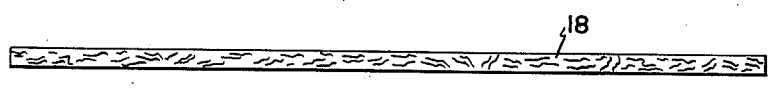
Figs. 2 and 3 are enlarged transverse vertical sections of spacers used in the cell of the invention.
Figure 3:
Figure 4:
Fig. 4 is a fragmentary vertical section, greatly enlarged, of an electrode of the invention.

18, Fig. 2, illustrates one part of a two piece asbestos or asbestos reinforced or porous ceramic spacer and 19 represents the other half having a pocket therein for retaining and enveloping the metallic plate or electrode shown in Fig. 4 along with its active material.

Referring to Fig. 4 the terminal tab 22 is attached to the impregnated porous metal electrode 20 by means of extrusions from tab 23 which are clinched over. One or more tabs 22 may be used on each electrode.

The porous metal 20 may be a spray-deposited, or sintered layer on top of or on both sides of a layer of asbestos paper impregnated with active material as shown at 21 or the plate 20 may be merely made up of a layer of porous metal which is self supporting.

Suitable base materials for porous sprayed electrodes according to my invention may comprise:
1. Thin layers of asbestos or other paper.
2. Layers of woven non-conductive porous material such as gauze of cloth.
3. Parallel layers of porous cords.
4. Woven metal screen.
5. Parallel metallic strands or cords.
6. Layers of woven fiberglass or cords or filaments thereof or mixtures thereof with paper.
7. A coating of active material with any of the above or any of the above impregnated with active material.
8. Coated iron pellets plated with nickel joined together by heating and spray depositing or sintering to form a coherent porous layer.
9. Perforated iron plates nickel plated and spray deposited with nickel surfaced particles into a unitary structure.
10. Perforated fiber base with porous metallic spray coating before or after impregnation.
11. Perforated thin iron spray deposited with iron and nickel plated thereafter.
12. Hollow or flat porous ceramic plates coated with porous metal layers.

In any case the battery plate stack according to my invention is substantially porous throughout and the metallic plates are impregnated with active material and the stack is held in pressurized assembly when assembled and in use so that the active materials remain where placed. The separators according to my invention are porous and gassing takes place due to my construction both from the edges of the porous metallic plates and from the edges of the porous separators.

The porous metallic plates contain active materials in the pores thereof and may be coated with active material layers in their interstices by electro-formation prior to pasting and impregnation if desired.

Thus I have invented and made accumulators of the alkaline type and lead type whereby the active material impregnates the thin layers of porous metal and is held in pressurized relation therein so that internal resistance is low due to vast area of metallic conductor in contact with the conductive active material which active material is made highly conductive by yielding pressure. The area of porous metallic plates in contact with the active plate material and electrolyte according to my invention is from five to fifty times as great as that procurable with die cast or plane metal grids. The particles comprising my plates are conductively, electrically and mechanically bonded so that the layers thereof are conductive throughout and gas and fluid permeable throughout. I prefer to use terminals which are of solid strip metal.

The interstices of the porous metal plates extend in all directions and are irregular and provide permeable devious channels for electrolyte in all directions. The particles comprising the plates are interconnected electrically and cohere mechanically so that they are highly conductive electrically and will withstand the flexible pressure applied to retain the active ingredients within their pores or interstices.

Figures 5, 6, 7:
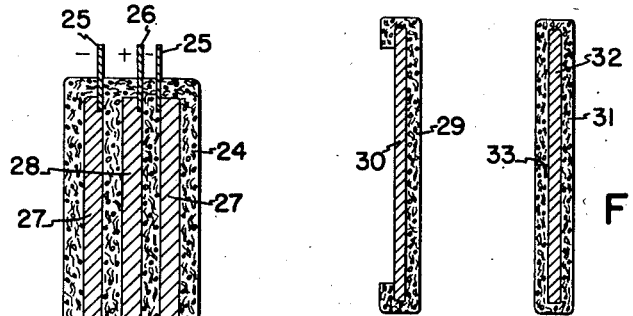
Fig. 5 is a fragmentary vertical section of an assembly of plates and spacers of the invention.
Fig. 6 is a vertical section of one type of assembly of a spacer and a battery plate.
Fig. 7 is a vertical section of a modified type of spacer and battery plate assembly.

Fig. 5 illustrates in fragmentary form an assembly of porous plates having a porous spacing envelope made of felted paper in envelope form 24 so that when the plates 27 and 28 are inserted therein containing the active materials in their interstices the active materials cannot escape since there are no seams nor openings nor joints in the battery stack envelope 24 except at the top where the terminals 25 and 26 protrude. The envelope 24 preferably is preformed and has a suitable flap or slit provided therein initially so that the plates 27 and 28 can be slid into the stack through the opening provided therein after which the envelope 24 can be completely sealed around the plates 27 and 28.

Fig. 6 illustrates a porous separator 29 folded over on its edges about the porous plate 30 Fig. 5.

Fig. 7 illustrates a continuous seamless envelope in the form of a seamless hollow sack made from wet laid paper so that the sack 31 surrounds the plate 32 continuously. If desired a slit 33 may be made therein for easier assembly which slit abuts tightly on assembly and pressing.

Having described my invention what I claim is:

1. In an electrolytic cell a plurality of spacer plates, a metallic plate interposed between each of adjacent spacer plates, a liquid-tight container closely surrounding the plates, the container having a side formed with resilient integral portions shaped to apply substantially uniform pressure to the plates to hold them together regardless of temperature or use variations, and an electrolyte in the container.

2. In an electrolytic cell a plurality of porous spacer plates, a metallic plate interposed between each of adjacent spacer plates, said metallic plates being porous and having active material filling the pores of the plates, a liquid-tight container closely surrounding the plates, the container having a side formed with resilient integral portions shaped to apply substantially uniform pressure to the plates to hold them together and to hold the active material in the metallic plates regardless of temperature or use variations, and an electrolyte in the container.

3. In an electrolytic cell a plurality of porous spacer plates, a metallic plate interposed between each of adjacent spacer plates, said metallic plates being porous and having active material filling the pores of the plates, a liquid-tight container closely surrounding the plates, the container having resilient integral endless bellows shaped to apply substantially uniform pressure holding the plates together and to hold the active material in the metallic plates regardless of temperature or use variations, and an electrolyte in the container.

JOSEPH B. BRENNAN.

References Cited in the file of this patent

UNITED STATES PATENTS

| Number | Name | Date |
|---|---|---|
| 362,640 | Ludlow | May 10, 1887 |
| 438,827 | Reynier | Oct. 21, 1890 |
| 726,272 | Feldkamp | Apr. 28, 1903 |
| 882,144 | Edison | Mar. 17, 1908 |
| 1,030,650 | De Martis | June 25, 1912 |
| 1,269,778 | Becker | June 18, 1918 |
| 1,379,088 | Edison | May 24, 1921 |
| 2,075,492 | Zimmerman | Mar. 30, 1937 |
| 2,213,128 | Langguth | Aug. 27, 1940 |
| 2,247,091 | Jumau | June 24, 1941 |
| 2,251,913 | Brennan | Aug. 12, 1941 |
| 2,379,374 | Payne | June 26, 1945 |

FOREIGN PATENTS

| Number | Country | Date |
|---|---|---|
| 531,774 | Great Britain | Jan. 10, 1941 |